Figure 3:
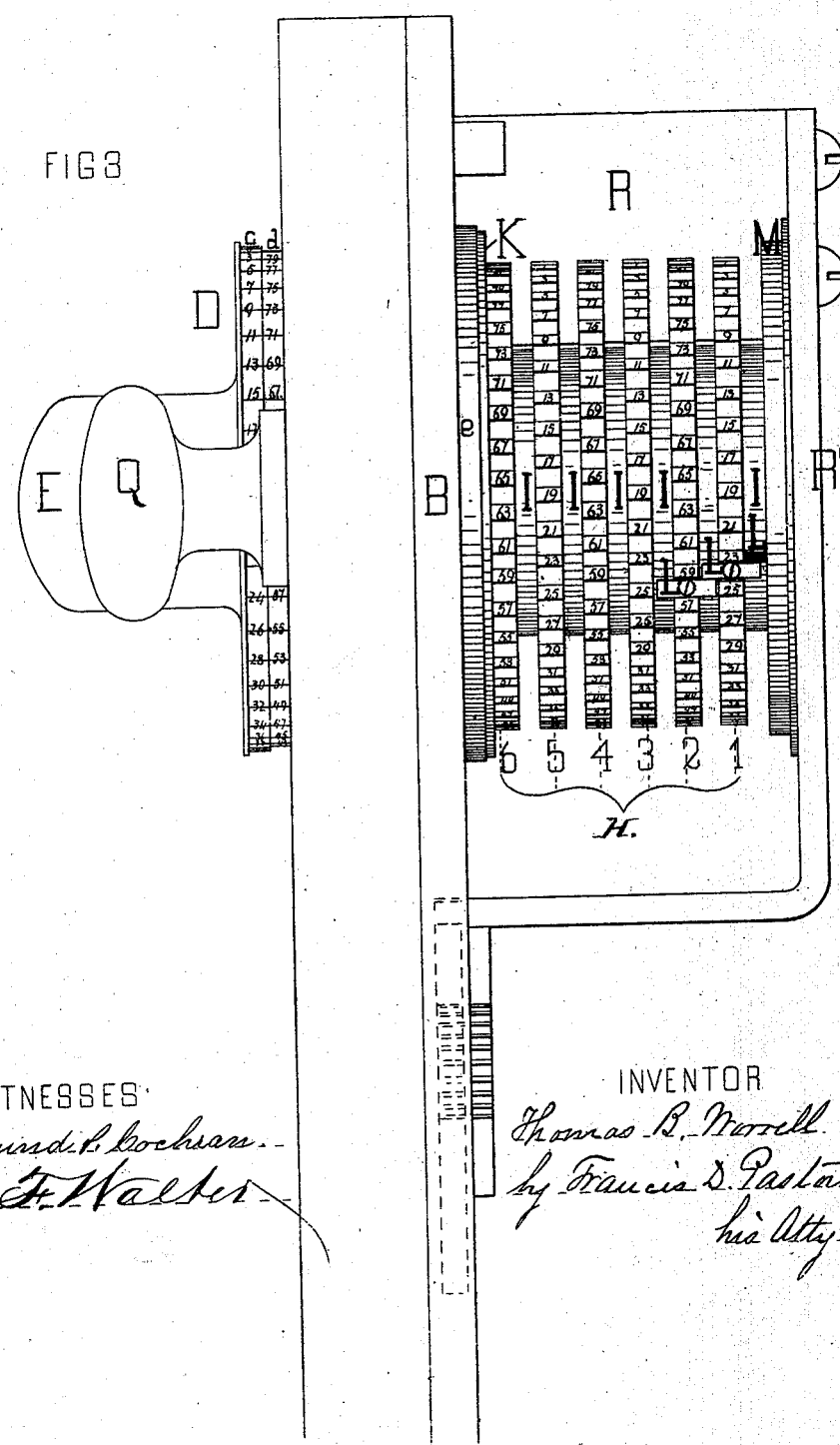

5 Sheets--Sheet 1.
T. B. WORRELL.
Permutation-Locks.
No. 146,737. Patented Jan. 20, 1874.
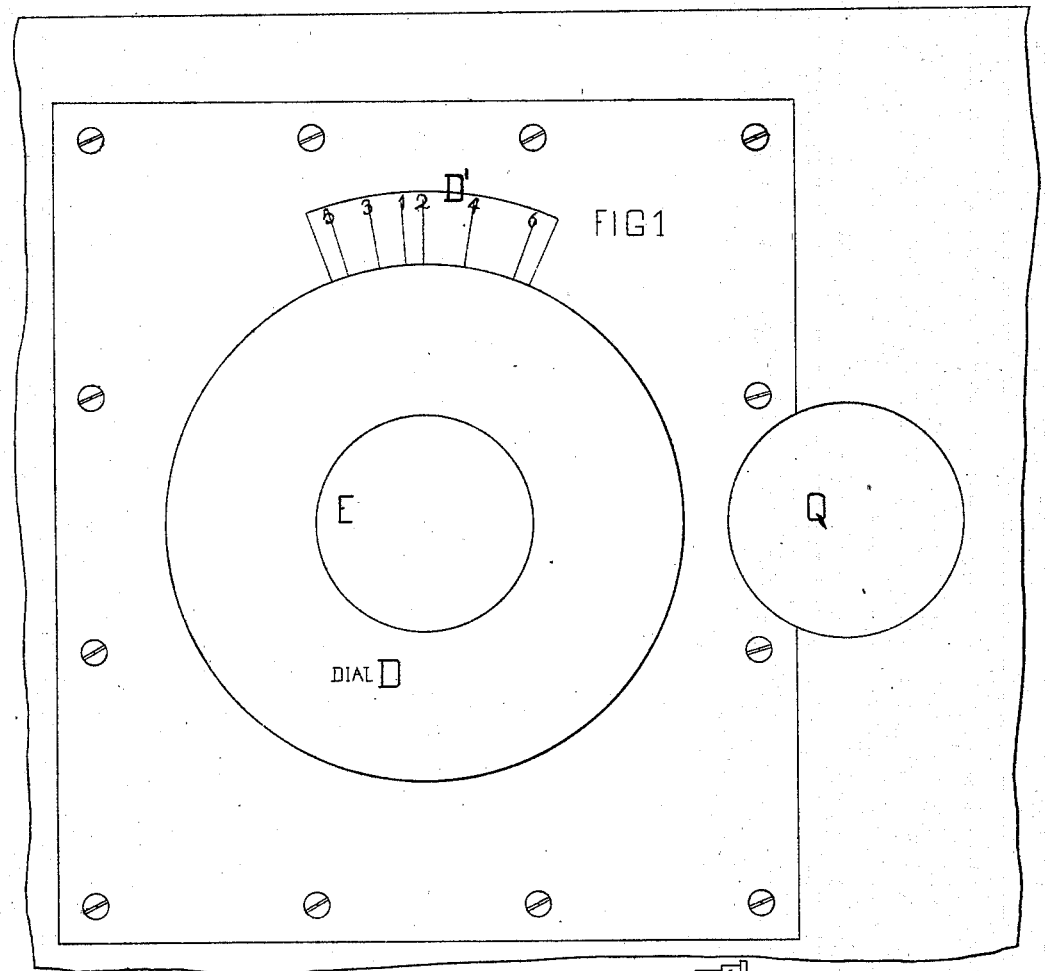
INVENTOR
Thomas B. Worrell
by Francis D. Pastorius
his Atty in fact
WITNESSES
Edmund P. Cochran
A. H. Walter
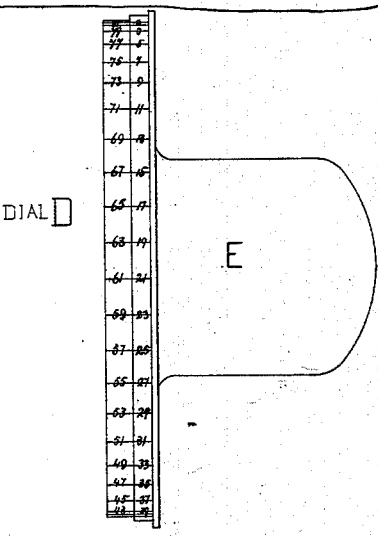

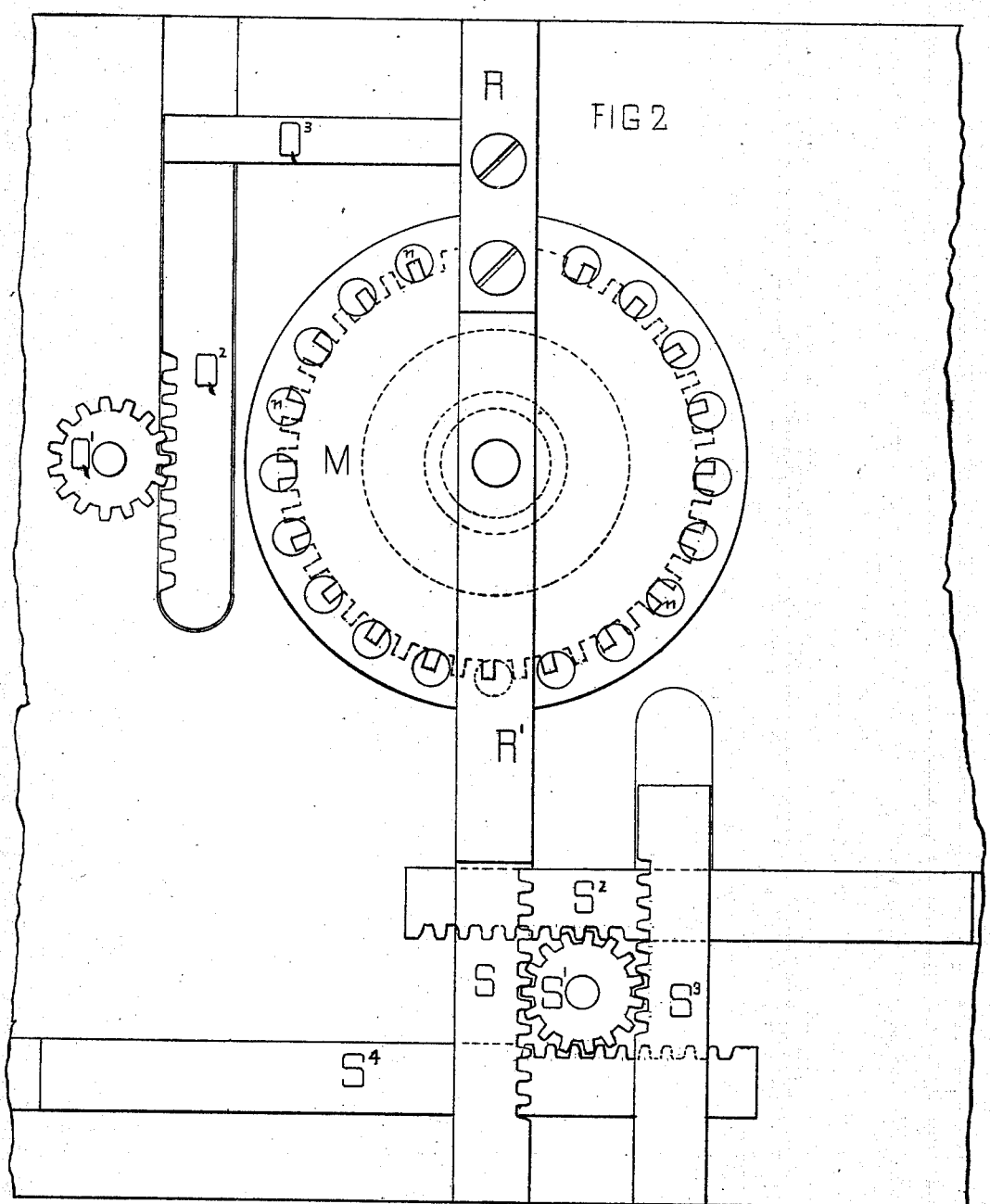

5 Sheets--Sheet 3.

T. B. WORRELL.
Permutation-Locks.

No. 146,737. Patented Jan. 20, 1874.

WITNESSES
Edmund P. Cochran
O. F. Walter

INVENTOR
Thomas B. Worrell
by Francis D. Pastorius
his Atty in fact

5 Sheets--Sheet 4.
T. B. WORRELL.
Permutation-Locks.
No. 146,737. Patented Jan. 20, 1874.
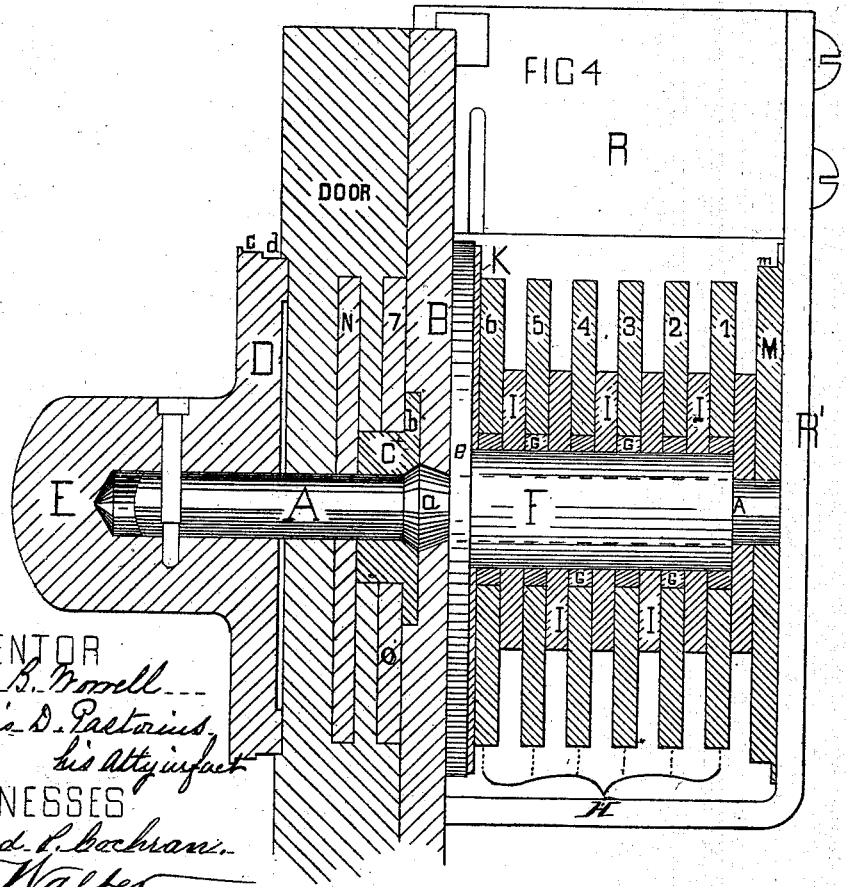
INVENTOR
Thomas B. Worrell
by Francis D. Pastorius,
his Atty in fact
WITNESSES
Edmund C. Cochran
O. F. Walter
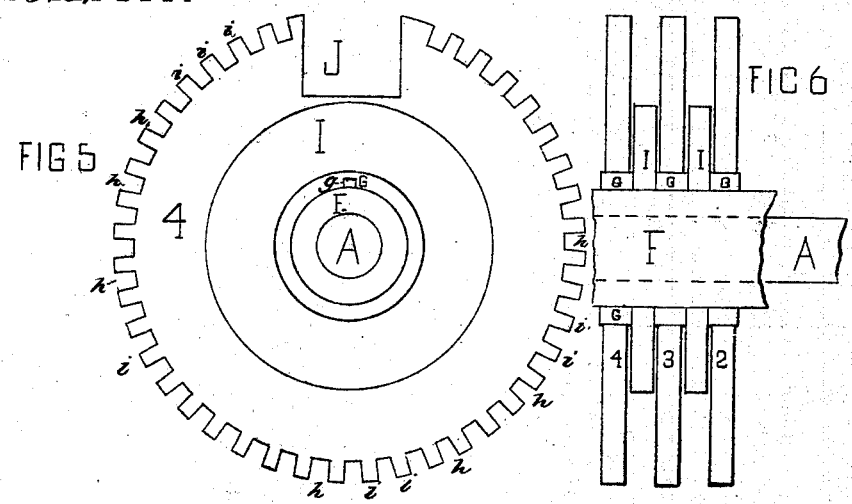

T. B. WORRELL.
Permutation-Locks.
No. 146,737. Patented Jan. 20, 1874.
5 Sheets--Sheet 5.
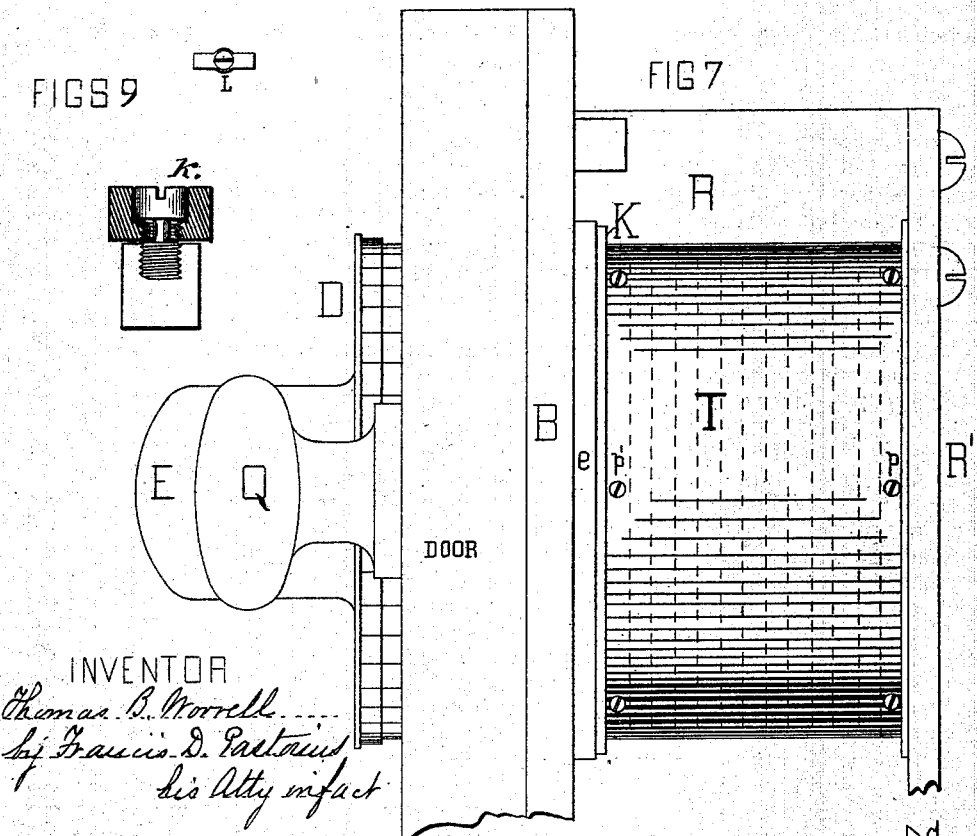
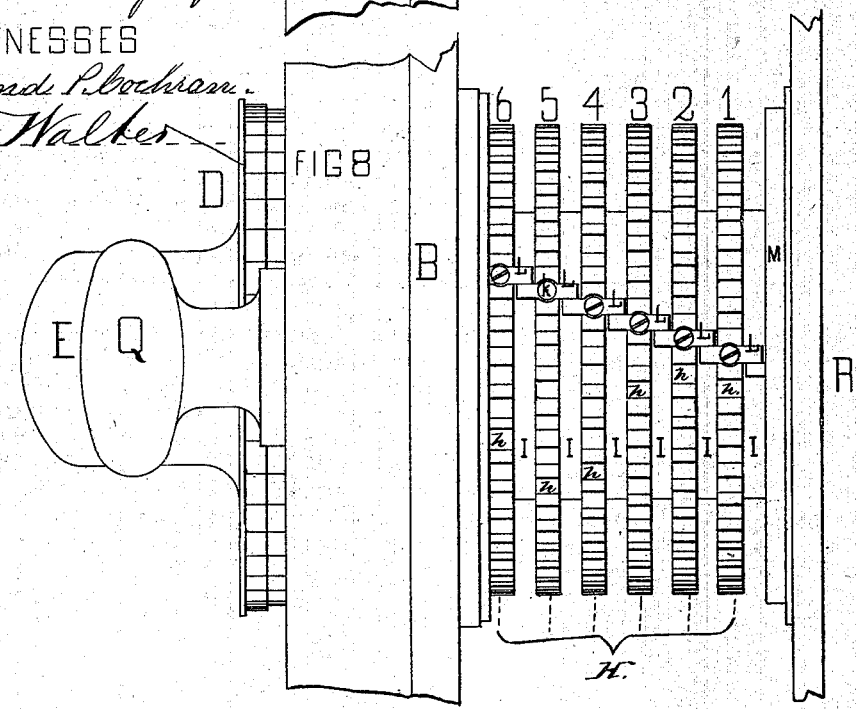
INVENTOR
Thomas B. Worrell
by Francis D. Pastorius
his Atty in fact
WITNESSES
Edmund S. Cochran
O. F. Walker

UNITED STATES PATENT OFFICE.

THOMAS B. WORRELL, OF PHILADELPHIA, PENNSYLVANIA.

IMPROVEMENT IN PERMUTATION-LOCKS.

Specification forming part of Letters Patent No. 146,737, dated January 20, 1874; application filed October 15, 1873.

*To all whom it may concern:*

Be it known that I, THOMAS B. WORRELL, of the city and county of Philadelphia and State of Pennsylvania, have invented an Improved Permutation-Lock, of which the following is a specification:

The invention is so fully and accurately described hereinafter that a preliminary description is not deemed necessary.

Figure 1 is a plan view of the dial, index, and bolt-knob. Fig. 2 is a face or plan view of that part of the lock which extends within the safe. Fig. 3 is a side view of the lock. Fig. 4 is a sectional side view. Fig. 5 is a face or plan view of one of the tumblers. Fig. 6 is a sectional view of several of the tumblers, showing the method employed for reducing their frictional contact. Fig. 7 is a side elevation of the lock, showing the cap used for covering the tumblers. Fig. 8 is a side elevation, showing the adjustment of the carriers. Figs. 9 are enlarged views of one of the carriers.

A is the tumbler-spindle, which passes entirely through the safe-door and the lock. It can be straight and cylindrical, or have a swell or an enlargement, $a$, of any suitable shape, to keep it from being forcibly driven in or drawn out. In this instance the swell $a$ is located in a recess formed partly in the lock-plate B, and partly within the flange $b$ of the hub C. D is a dial and knob on the outer end of the spindle; it is recessed as shown at $c\ d$, or beveled inwardly, for the purpose hereinafter fully described. F is a hub in which the spindle A turns; it is secured to the plate B of the lock by its flange $e$. G are collars secured to the hub F by the feather $g$. Turning freely on each is a rotary tumbler, H. The collars are slightly thicker than the tumblers to prevent them from having frictional contact with the washers I which intervene. Like the collars, the washers are fixed to the hub F by the feather $g$. The tumblers H have equidistant notches $h$, and dog-slots J, formed in their peripheries. The projections $i$ are numbered to correspond with the numbers on the recessed dial D. Blank backs $k$ are fitted to all or any number of the tumblers. L is a carrier, which is secured in any required notch of each tumbler. It is constructed as follows. The center is tapped for the reception of the holding-screw $k$. The wings $l$ extend oppositely from the center. The holding-screw takes into a tapped hole in the notch $h$ of the tumbler. Its thread is shortened in order to drop the thread of the carrier when about tightening it in place. When the carrier is in place the wings project laterally to contact with the carriers of the adjacent tumblers. M is a driving-wheel fixed to that end of the spindle A which projects beyond the hub F. It is provided with a tappet or carrier, either by screwing it to the rim $m$, or by extending it through one of a series of openings, $n$, formed through it. N is a driving-wheel attached to the spindle A, and O a tumbler on the hub C, (more than one tumbler can be used.) They are separated from the driving-wheel M and tumblers H by the lock-plate B, from which it will be observed that the lock is composed of two sets of tumblers operated by distinct driving-wheels on the same spindle. The driving-wheel N accomplishes the purpose of the idle wheel Y, as per the fifth clause of the claim of the Letters Patent No. 135,957 granted to Thomas B. Worrell, February 5, 1873, for improvements in permutation-locks.

The mechanism for simultaneously operating the bolts and the fence or dog of the lock consists of the locking-knob Q and the small pinion $Q^1$ on the opposite ends of the same spindle. The pinion meshes with a vertically-moving rack-bar, $Q^2$, which is connected, by means of a tie-piece, $Q^3$, to the dog R. A bent arm, $R^1$, depends from the dog R. It embraces the tumblers H, and is jointed below to a vertical rack and bolt, S, which gears with a pinion, $S^1$. The pinion $S^1$ gears with the rack-bolts $S^2\ S^3\ S^4$. All the bolts and the dog R are moved simultaneously by turning the locking-knob Q.

Having described the construction of the lock, its operation is as follows—supposing it to have been locked on the following numbers and the tumblers disarranged: The carriers are secured in the notches of their respective tumblers at the numbers given. No. 19 for the sixth tumbler, to correspond with No. 19 on the inner flange of dial; No. 75 for the fifth tumbler, to correspond with No. 75 on the outer flange of dial; No. 9 for the fourth tumbler, to correspond with No. 9 on the inner flange of dial; No. 77 for the third tumbler, to correspond with No. 77 on the outer flange of dial; No. 57 for the second tumbler, to correspond with No. 57 on the inner flange of dial; No. 23 for the first tumbler, to correspond with No. 23 on the outer flange of dial. For the tumbler O and the driving-wheel N, No. 25 of the dial opposite to No. 5 of the index, inner row; No. 9 of the dial opposite to No. 2 of the index, outer row.

The operation of unlocking consists in arranging the dog-slots J of the tumblers and driving-wheels in such way, relatively to each other and to the dog, that they will all be in a line in the plane of descent of the dog. If one of the slots is not in a line with the others the bolts cannot be moved, for the reason that the descent of the dog will be stopped. In proceeding to unlock, the knob E of the spindle A, and the recessed dial D, must be turned from right to left six times, (the number of inner set-tumblers,) or until the carrier of the driving-wheel M has brought all the carriers in contact, following one another, and until No. 19 on the inner row of the dial opposites No. 6 on the index, which aligns the dog-slot of No. 6 of the tumblers H under the dog. Second. Turn the spindle five times from left to right, the first turn being from No. 19 to No. 5, the remaining four turns being from No. 5 to No. 5, and until No. 75 on the outer row of the recessed dial opposites No. 5 on the index-plate, which aligns the dog-slot of tumbler No. 5 under the dog. Third. Turn the spindle four times from right to left, the first turn being from No. 5 to No. 5, as above described, until No. 9 of the inner row of the dial opposites No. 4 of the index, which aligns the dog-slot of tumbler No. 4. Fourth. Turn the dial three times from left to right, as before, and until No. 77 on the outer row of the dial opposites No. 3, which aligns the dog-slot of tumbler No. 3 under the dog. Fifth. Turn the dial two times from right to left, as before, and until No. 57 on the inner row of the dial opposites No. 2, which aligns the dog-slot of tumbler No. 2 under the dog. Sixth. Turn the dial one time from left to right, as before, and until No. 23 of the outer row of the dial opposites No. 1 of the index, which aligns the dog-slot of tumbler No. 1 under the dog. Seventh. Turn the dial from right to left until No. 25 of the inner row of the dial opposites No. 5 of the index, which aligns the dog-slot of the tumbler O, which is the tumbler on the opposite side of the lock-plate. Eighth. Turn the dial from left to right until No. 9 of the outer row of the dial opposites No. 2 of the index, which aligns the dog-slots of the driving-wheels M and N under the dog. All the dog-slots being in a line under the dog it can be lowered into them, and the bolts moved in by turning the locking-knob Q in the proper direction.

It will be noticed, in Fig. 5, that the adjacent notches on the opposite sides of the dog-slot J are of unequal widths—one is the same width as the projection i, the other is as wide as a projection and a notch. They are so constructed to compensate for the width of the carriers in aligning the dog-slots. If otherwise, any two of the tumblers could be so combined to make it impossible to bring the slots under the dog at a time. To alternate the large and small adjacent notches the tumblers must be reversed on the spindle.

T is a cap or band, which incloses the tumblers H. It is attached to the rim m of the driving-wheel M, which is made of a larger diameter than the tumblers to enable the cap or band to turn freely over them. Its dog-slot is aligned with that of the driving-wheel. It effectually defeats any attempt at feeling the tumblers by instruments introduced through an opening made in the safe-door beyond the tumblers. By fastening the other end of the cap to the sixth tumbler, and securing the tumbler to the spindle, it can be made the driving-wheel in place of the wheel M.

The dial D is recessed in steps e d, as shown, or beveled inwardly to prevent the locking-numbers from being observed by any person other than the operator who may be present. The blank backs K of the tumblers H prevent the positions of the tumblers being felt by means of an opening made through safe or any other place by which a feeler could be introduced.

The dial D and the spindle-knob E are so arranged that the dial can be taken off at pleasure. The person in charge of the safe can, by taken away the dial, effectually dispose of any attempt at the lock.

I claim as my invention—

1. A permutation-lock provided with tumblers on the same spindle, and on opposite sides of the lock-plate, and operated by separate distinct driving-wheels, also on the same spindle, for the purpose shown and described.

2. The dial D, recessed in steps of decreasing diameters, as shown and described.

3. The carrier and its holding screw-bolt, the shank of which bolt is not threaded, and passes easily and freely through the screw-thread of the carrier after the thread of the bolt has passed through the carrier.

4. The cap or band T, secured to, and turning with, the driving-wheel M, for the purpose shown and described.

In testimony whereof I hereunto sign my name in presence of two subscribing witnesses.

THOMAS B. WORRELL.

Witnesses:
EDMUND P. COCHRAN,
FRANCIS D. PASTORIUS.